April 22, 1969    R. A. ALLIEGRO    3,440,312
METHOD OF PREPARING PLATES OF BORON CARBIDE POWDER
Filed July 30, 1965
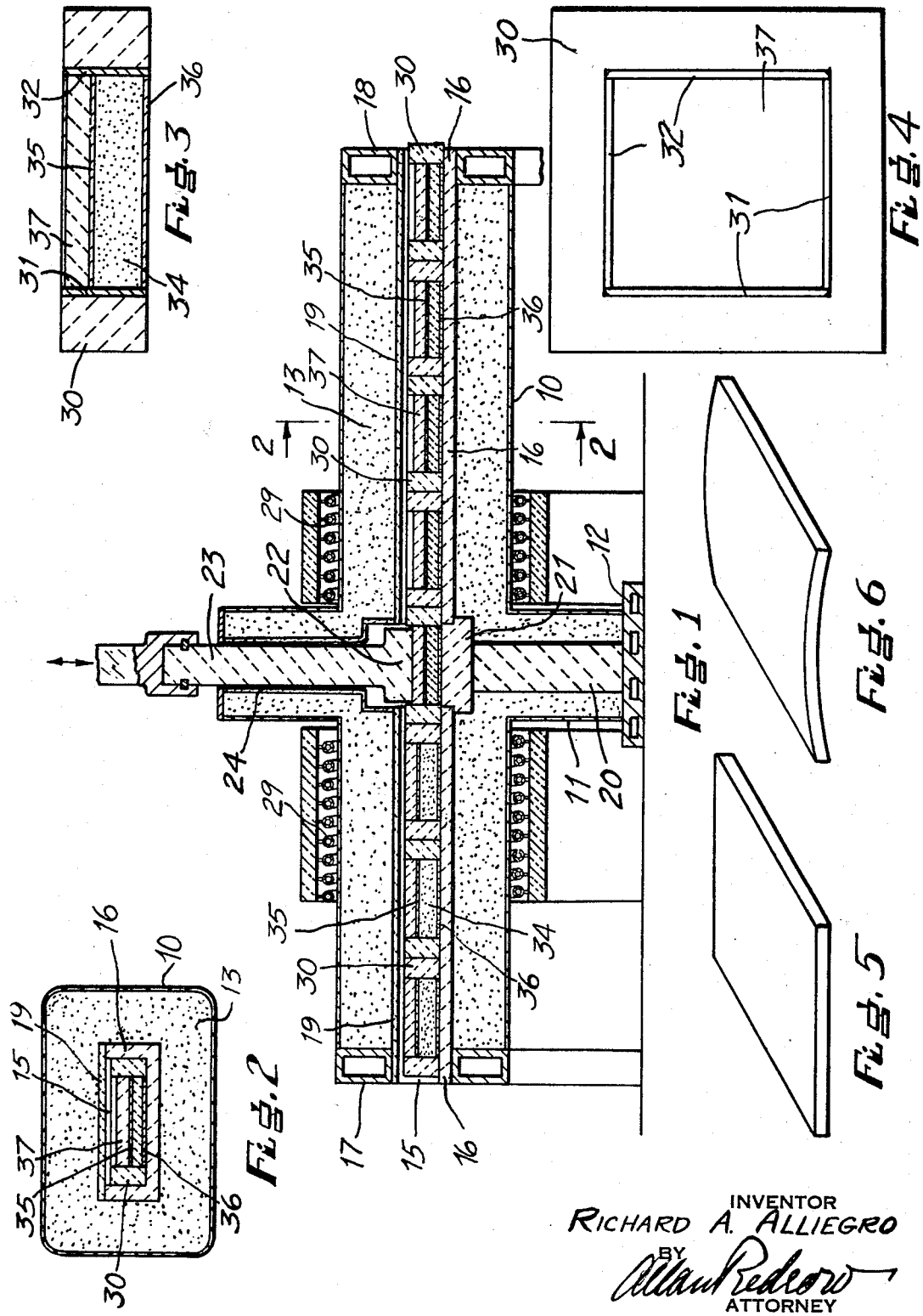
INVENTOR
RICHARD A. ALLIEGRO
BY
Allan Redrow
ATTORNEY United States Patent Office 3,440,312
Patented Apr. 22, 1969

3,440,312
METHOD OF PREPARING PLATES OF
BORON CARBIDE POWDER
Richard A. Alliegro, Holden, Mass., assignor to
Norton Company, Worcester, Mass., a corporation of Massachusetts
Filed July 30, 1965, Ser. No. 475,940
Int. Cl. B29f 5/02
U.S. Cl. 264—125                                    4 Claims

ABSTRACT OF THE DISCLOSURE

A method of preparing a refractory molded plate from boron carbide powder in which the powder is placed within a shallow graphite mold between confining elements, and introduced into a preheating zone of a furnace and brought to a temperature of between 2200 and 2230° C., then subjected to compacting pressure of 1000–2000 p.s.i. for 3–5 minutes to form the powder into a molded plate, which is then slowly cooled as the plate leaves the furnace.

This invention relates to the molding of relatively thin refractory plates and more particularly to a hot pressing method for the manufacture of thin boron carbide plates.

It is an object of this invention to provide an improved method for making thin refractory plates including the use of new mold equipment and pressing procedure.

Typical of the plates such as produced by the apparatus and process herein disclosed are 4 x 4 inch, 6 x 6 inch, and 8 x 8 inch square plates varying in thickness from 0.25 to 0.6 inch in thickness. This invention has particular application to what is referred to as thin plates. By "thin" is meant plates having a maximum dimension to thickness ratio of from about 4 to 1 to about 60 to 1.

Whereas in the past it has been the practice to form a number of hot pressed units in a single pressing operation, each unit being disposed within a single chamber in a multiple mold structure, or in other instances molding elongated single objects confined within a chamber by applying end pressure to the object, I have conceived a procedure for hot pressing flat relatively thin masses having top and bottom faces and thin side faces, of refractory powder by confining the powder in a mold. The confined mass of powder is individually heated and pressed across the top and bottom faces while confining the thin side faces in the mold. In following this procedure it is possible to preheat the powder rapidly across a thin section of the mold and thereafter subject the powder to a relatively quick hot pressing action while continuing the heat and confining the powder in the mold. The main pressing forces are produced across the refractory body from the top and bottom faces, both faces being backed up by pressing means engaging evenly across the entire face. The pressing means disposed in contact with the faces produces pressure directly through the thin section and, since there is very little hydraulic flow in the body mass, very little sidewise pressure is produced against the relatively thin sides of the mold. Because of this pressing action produced across the top and bottom faces of the thin section, a rather thin mold device may be used to sustain the side faces of the plate as the pressing action proceeds. The performance of this pressing procedure within the thin wall or "picture frame" type mold makes it possible to complete the hot pressing of individual thin refractory plates in a much faster time than has heretofore been thought possible with much less apparent wear on the mold structure.

The invention will be understood more fully from the detailed description which follows wherein FIG. 1 is a sectional side elevation of a furnace structure in which my process may be performed. FIG. 2 is a sectional view taken on line 2—2 of FIG. 1. FIG. 3 is a detailed sectional side view of a mold for pressing refractory plates. FIG. 4 is a top plan view of a mold such as is shown in FIG. 3. FIG. 5 is a perspective of a flat plate such as may be produced in following my invention and FIG. 6 shows a curved plate such as may be produced.

In following my invention, I preferably provide a furnace construction or heating and pressing device as shown in FIG. 1. This furnace construction is more or less diagrammatically shown but includes a suitable supporting casing 10 mounted on a pedestal 11 preferably insulated from the floor by water cooled platen 12. The casing 10 is somewhat enlarged and may be filled with any suitable insulating material 13 such as lampblack insulation.

Extending horizontally through the elongated casing 10 is a passage 15 formed by supporting U-shaped graphite troughs 16 within the casing 10. The troughs 16 are provided with graphite tops 19.

At opposite ends of the horizontal passageway, the troughs 16 and tops 19 forming the passage may be sealed against the casing 10 by water cooled glands 17 at the inlet end 18 at the outlet. Within the casing 10 and approximately centrally disposed thereof is a pedestal 20 preferably formed of silicon carbide which supports a pressing platform 21. The upper surface of the platform 21 is maintained in generally horizontal alignment with the floor of the passage 15 over which the hot pressing molds move. Vertically above the platform 21 is a pressing head 22 that is carried at the lower end of a push rod 23 that is also preferably formed of silicon carbide. A suitable guiding bearing arrangement 24 is provided for surrounding the push rod and if necessary insulation may be provided between the bearing 24 and an extension of casing 10 to permit the push rod to pass vertically upwardly to the top of the casing to be actuated by any suitable power means such as a hydraulic press.

Any conventional heating means may be used to produce heat within the passage 15. Electrical resistor bars suitably placed adjacent the passageway could be provided, however, in my preferred construction I use induction heating means 29 disposed both on the inlet and on the outlet side of the pressing station as best shown in FIG. 1. The induction heating coils disposed on the inlet side of the pressing station are designed to introduce relatively more heat to the product being hot pressed to effect preheating of the powder. The heating by means of the induction heating coils disposed on the outlet side of the passage and past the pressing station is provided to control the cooling cycle after completion of the hot pressing operation.

In the use of my hot pressing apparatus, relatively thin plates are produced by passing the material to be hot pressed flatwise through passage 15 to accomplish the heating and pressing operation. In the normal hot pressing operation powder is pressed in a mold and is contained within the mold while pressure and heat are applied. I provide a mold such as is shown in FIGS. 3 and 4 for producing a flat plate such as is disclosed in FIG. 5. It will be noted that such a mold takes the form of a "picture frame" in that it is formed of thin walls 30 preferably of graphite to define an opening 31. In performing my process, the inner walls of the mold are provided with ha suitable liner 32 of graphite, which may be provided with a release coating, which receives powder 34 to be pressed. Suitable top and bottom plates 35 and 36 of graphite are situated above and below the powder that is evenly distributed throughout the mold and a top plate 37 also of graphite is then placed over the plate 35.

The filled molds are inserted in the inlet on the left hand end of the hot pressing device disclosed in FIG. 1 and are intermittently fed forwardly through the passage 15 until they arrive at the hot pressing position near the center of the furnace. As the mold and powder charge move forward in a stepwise fashion the powder held within the mold is preheated to the temperature required to complete the hot pressing action. The inlet passage and heater construction 29 are coordinated with the stepwise movement of the molds such that sufficient heat is introduced to the powder to bring it up to hot pressing temperature. The mold and powder are then moved into position on the hot pressing platform 21 and the push rod 23 and pressing head 22 are driven downwardly to engage the top plate 37 which forms a pressing plate to transmit the force from the push rod to distribute it evenly over the entire mass of heated powder contained within the mold. It will be noted that as long as the hot pressing station is surrounded by the heating means 29 both on the inlet and exit sides, heat will continue to flow into the mold and powder charge while the pressing action continues.

The preferred design of the furnace as in the disclosed design is such that essentially all of the heat flow to the molding powder is through plates 35, 36 and 37, and the molding powder reaches its hot pressing (maximum) temperature just as it passes into the hot pressing zone of the furnace. In the hot pressing zone the heat flow is just sufficient to maintain the powder at the optimum designed temperature.

After pressing action has been continued for a sufficient time period, the push rod 23 is retracted and the mold assembly together with the hot pressed plate is moved stepwise from the pressing station toward the exit end of the furnace while the next succeeding mold moves into position at the pressing station.

The completed plate then is cooled under controlled conditions as it moves toward the exit of the furnace and after being completely cooled upon removal from the furnace, is stripped from the mold.

It is to be understood that the inlet passage and exit passage associated with the hot pressing station may be made as long or as short as desired. The length is controlled by the heat input and cooling cycle considered appropriate for the particular product being hot pressed.

As an example of one type of product which can be made in following this invention, a boron carbide powder is prepared having boron present in an amount from 76% to 78% (by weight), carbon present in an amount of from 21% to 23% and with 0.2% iron, the ingredients of the powder having a particle size of the order of 10 microns as measured on a Micromerograph. A powder having this composition may be placed in a mold 30 and preheated to a temperature of 2220° C. plus or minus 10° C. The mold and powder are heated to this temperature as they move through the inlet end of the furnace and obtain this temperature by the time the mold is placed in position on the hot press platform 21. The push rod 23 is then driven against the hot press plate positioned over the powder to produce a pressure of about 1000 pounds per square inch over the entire surface the powder charge within the mold. This pressure is maintained for a period of five minutes while the temperature of the powder is maintained in the range of 2220° C. It will be found that the boron carbide molding powder of this composition can be almost fully densified to at least 2.3 grams per cubic centimeter and usually approaches the theoretical density of 2.51 grams per cubic centimeter. The hot pressed plate produced by this operation is then slowly cooled as it moves to the exit end of the furnace and after the mold is removed from the furnace, the mold and contents are allowed to cool to room temperature whereupon the hot pressed boron carbide plate may be stripped from the mold. Plates produced in this fashion have been found to have the hardness of boron carbide which is 2800 on the $Knoop_{100}$ scale and a compressive strength in the order of 400,000 pounds per square inch. Such plates may be used for mold linings, wear plates or for other purposes. Because of the strength and lightness of such plates, the boron carbide hot pressed thin structures are useful in any structural members where high strength and light weight are of importance.

As another example of the molding of boron carbide plates a powder as described above is filled into the picture frame mold such as is shown in either FIGS. 3 or 4 and passed through a furnace to be preheated to a temperature of 2200° C. plus or minus 10°. The mold and heated powder when positioned on the hot press platform 21 is pressed by driving the push rod 23 and pressing head 22 against the hot press plate 37 with sufficient force to produce 2000 pounds per square inch pressure approximately over the entire surface of the mass of powder. Such a pressure for a time period of approximately three minutes accomplishes the production of a plate having the same characteristics as the plate described in the previous example.

If curved plates are to be formed, it is apparent that the bottom plate 36 is shaped to provide an incompressible filler having the desired curvature. The upper plate 35 and hot press plate 37 is likewise shaped to engage the powder charge 34 from above to bear against the upper surface of the powder to shape the final hot press plate as desired.

It is apparent that other powder compositions formulated either from boron carbide or other compositions could be used. Various release agents could be used on the sidewalls of the mold and other well-known hot pressing techniques may be applied.

Because of the operation of the disclosed process, in which the mold and its contents are subjected to high temperature for a minimum period of time, it is possible to employ release agents on the interior of the mold and on the powder contacting surfaces of plates 35 and 36. Suitable release agents are: a flake graphite slurry in a Carbowax (Union Carbide), methylene chloride vehicle; graphite paper (Dow Chemical Company); Grafoil (National Carbon); and cardboard.

Other refractory powder compositions, 10 micron particle size, which can be molded in the disclosed furnace are:

|  | Approx., ° C. | Pressure, p.s.i. |
| --- | --- | --- |
| Alumina | 1,700 | 1–2,000 |
| Bauxite | 1,300 | 1–2,000 |
| Titanium carbide | 2,000 | 1–2,000 |
| Titanium diboride | 2,000 | 1–2,000 |
| Zirconium diboride | 2,000 | 1–2,000 |

In view of the relatively high processing temperatures required for boron carbide, the disclosed process is of particular application to fabrication of boron carbide plates.

The use of a simple mold with thin self-supported side walls and the pressing of a single layer in a mold at one time, in the apparatus disclosed, result in a uniform heating with no localized hot spots. Lower overall temperature and pressures may be employed than in prior art apparatus and more uniform and reproducible products result. Furthermore, the times and temperatures employed in the present apparatus permit the use of mold release coatings or layers, not previously practicable at the times, temperatures, and pressures required for producing boron carbide articles.

Further due to the introduction of heat to the powder mass distributed in a very thin layer, it is possible to flow heat into the powder mass quite rapidly. The heated mass of powder which has been quickly brought to the hot pressing temperature may be quickly pressed to complete the necessary densification, thus saving wear and tear on the molds and producing maximum uniformity from piece to piece.

I claim:
1. A method of hot pressing boron carbide powder to produce a thin plate of a specific gravity between 2.3 and 2.5, comprising placing the powder in a single uniform layer within a graphite mold having an opening therein of substantial area, said area in the mold being defined by side faces in the form of a relatively thin wall surrounding the opening, and confining said layer within the mold between contacting surfaces forming opposed top and bottom mold surfaces, passing said confined layer of powder in said mold through a preheating zone and preheating the confined layer of powder up to a hot pressing temperature essentially through the top and bottom mold surfaces, said hot pressing temperature being in the range of from about 2200° C. to about 2220° C. plus or minus 10° C., passing said confined layer of powder in said mold to a hot pressing zone to position said mold between a support element and a pressure applying element, maintaining the confined layer of powder at said hot pressing temperature and applying sufficient pressure to the confined layer of powder to compact said layer of powder into a thin plate having specific gravity between 2.3 and 2.5, said pressure established on said layer of powder being in a range of from about 1000 p.s.i. for a time period of about five minutes to about 2000 p.s.i. for a time period of about three minutes, releasing said pressure on said thin plate maintained substantially at said hot pressing temperature and passing said thin plate slowly through a cooling zone to cool said thin plate.

2. The method according to claim 1 wherein a plurality of boron carbide plates are produced one after the other by intermittently feeding said boron carbide powder confined in a plurality of said molds, arranged in tandem, through said preheating zone to said hot pressing zone and then through said cooling zone.

3. The method according to claim 1 wherein the thin plate produced has a thickness to longest dimension ratio of between 1 to 60 and 1 to 4.

4. The method according to claim 1 wherein a carbonaceous mold release agent is applied to the side faces of said mold and to the opposed top and bottom mold surfaces.

References Cited
UNITED STATES PATENTS

| | | | |
|---|---|---|---|
| 2,473,476 | 6/1949 | Knowlton | 264—125 |
| 3,258,514 | 6/1966 | Roach | 264—125 |
| 2,215,214 | 9/1940 | Galey | 264—332 |
| 2,027,786 | 1/1936 | Ridgway et al. | 264—332 |

ROBERT F. WHITE, *Primary Examiner.*

J. R. HALL, *Assistant Examiner.*

U.S. Cl. X.R.

264—297, 332